(12) United States Patent
Yanez et al.

(10) Patent No.: US 11,033,909 B2
(45) Date of Patent: Jun. 15, 2021

(54) FROTH FLOTATION ARRANGEMENT AND A FROTH FLOTATION METHOD

(71) Applicant: OUTOTEC (FINLAND) OY, Espoo (FI)

(72) Inventors: Alejandro Yanez, Helsinki (FI); Rodrigo Grau, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/626,380

(22) PCT Filed: Jul. 4, 2017

(86) PCT No.: PCT/FI2017/050502
§ 371 (c)(1),
(2) Date: Dec. 24, 2019

(87) PCT Pub. No.: WO2019/008214
PCT Pub. Date: Jan. 10, 2019

(65) Prior Publication Data
US 2020/0129992 A1   Apr. 30, 2020

(51) Int. Cl.
*B03D 1/16* (2006.01)
*B03D 1/02* (2006.01)
(Continued)

(52) U.S. Cl.
CPC ........... *B03D 1/028* (2013.01); *B03D 1/1462* (2013.01); *B03D 1/1406* (2013.01);
(Continued)

(58) Field of Classification Search
CPC .... B03D 1/028; B03D 1/1462; B03D 1/1406; B03D 1/1456; B03D 1/16; B03D 2203/02; C02F 1/24
(Continued)

(56) References Cited

U.S. PATENT DOCUMENTS 2,182,442 A   12/1939   Booth
2,369,401 A   2/1945    Morash
(Continued)

FOREIGN PATENT DOCUMENTS

CN   1066406 A   11/1992
CN   2892279 Y   4/2007
(Continued)

OTHER PUBLICATIONS

Heiskanen, K et al., 1994, "Idividual Operation and Control of Large 100 m3 Flotation Cell", A. Sumulov Memorial Vplume, vol. II Floation; IV meeting of the SouthernHemisphere on Mineral Technology; ans III Lating American Congress on Froth Flotation: 1994 ; pp. 501-515. (Year: 1994).*

(Continued)

*Primary Examiner* — Thomas M Lithgow
(74) *Attorney, Agent, or Firm* — Robert P. Michal, Esq.; Carter, DeLuca & Farrell LLP

(57) ABSTRACT

A froth flotation arrangement and method for treating mineral ore particles suspended in slurry includes a flotation cell for separating the slurry into an underflow and an overflow and a primary line including at least three flotation cells connected in series, wherein each subsequent flotation cell is arranged to receive the underflow from the previous flotation cell, the flotation cell includes a tank and an impeller within the tank, and the flotation cell includes a gas supply within the tank, the tank includes a volume of at least 200 m3, the flotation cell including a froth collection launder capable to receive the overflow the froth collection launder including a froth overflow lip, the flotation cell having an available froth surface area (A froth), the flotation cell having a pulp area (A pulp), where the pulp area (A pulp) is calculated as an average from the cross sectional areas of the tank at the height (h1) of the impeller. A ratio between a height (h) from (Continued)

a bottom of the tank to the froth overflow lip of the froth collection launder and the diameter (D) of the tank at the height (h1) of the impeller (h/D) is less than 1.5.

18 Claims, 4 Drawing Sheets

(51) Int. Cl.
    *B03D 1/14*     (2006.01)
    *C02F 1/24*     (2006.01)
    *D21B 1/32*     (2006.01)

(52) U.S. Cl.
    CPC .............. *B03D 1/1456* (2013.01); *B03D 1/16* (2013.01); *B03D 2203/02* (2013.01); *C02F 1/24* (2013.01); *D21B 1/327* (2013.01)

(58) Field of Classification Search
    USPC ........................................................ 209/169
    See application file for complete search history.

(56) References Cited

U.S. PATENT DOCUMENTS

| | | | |
|---|---|---|---|
| 3,342,331 A * | 9/1967 | Maxwell .............. | B03D 1/1456 209/170 |
| 5,039,400 A | 8/1991 | Kallioinen et al. | |
| 5,251,764 A | 10/1993 | Niitti et al. | |

FOREIGN PATENT DOCUMENTS

| EP | 0146235 | A2 | 6/1985 |
|---|---|---|---|
| NO | 0249768 | A1 | 6/2002 |
| NO | 2009115348 | A1 | 9/2009 |
| WO | 9320945 | A1 | 10/1993 |
| WO | 2009115348 | A1 | 9/2009 |

OTHER PUBLICATIONS

Yianatos, J.B. et al., 2006, Characterization of Large Size Flotation Cells, Minerals Engineering 19 (2006) pp. 531-538. (Year: 2006).*
International Search Report issued by the Finnish Patent and Registration Office acting as the International Searching Authority in relation to International Application No. PCT/FI2017/050502 dated Oct. 30, 2017 (6 pages).
Written Opinion of the International Searching Authority issued by the Finnish Patent and Registration Office acting as the International Searching Authority in relation to International Application No. PCT/FI2017/050502 dated Oct. 30, 2017 (9 pages).
Outotec:"OUTOTEC Flotation Tankcell®e-Series", Dec. 31, 2016, XP 55760514 (4 pages).
Extended European Search Report issued by the European Patent Office in relation to European Application No. 17916918.0 dated Jan. 19, 2021 (7 pages).
Eurasian Office Action issued by the Eurasian Patent Organization in relation to Eurasian Application No. 202090037 dated Jan. 28, 2021 (4 pages) along with English language translation (2 pages).
Chilean Office Action issued by the Chilean Patent Office in relation to Chilean Application No. 201903877 dated Jan. 20, 2021 (31 pages).
Chinese Office Action issued by the Chinese Patent Office in relation to Chinese Application No. 201780093326.5 dated Mar. 12, 2021 (9 pages).

* cited by examiner

FROTH FLOTATION ARRANGEMENT AND A FROTH FLOTATION METHOD

CROSS-REFERENCE TO RELATED APPLICATIONS

This application is a national phase entry under 35 U.S.C. 371 of PCT International Application No. PCT/FI2017/050502 filed Jul. 4, 2017, the disclosure of this application is expressly incorporated herein by reference in its entirety.

FIELD OF THE INVENTION

The invention relates to a froth flotation arrangement and a froth flotation method, and particularly to an arrangement and a method comprising a primary line comprising at least three flotation cells connected in series.

BACKGROUND OF THE INVENTION

A froth flotation arrangement is used for treating mineral ore particles suspended in slurry.

BRIEF DESCRIPTION OF THE INVENTION

An object of the present invention is to provide a froth flotation arrangement and a method for treating mineral ore particles suspended in slurry. The objects of the invention are achieved by a method and an arrangement which are characterized by what is stated in the independent claims. The preferred embodiments of the invention are disclosed in the dependent claims.

The invention is based on an arrangement for treating mineral ore particles suspended in slurry, comprising a flotation cell for separating the slurry into an underflow and an overflow. The arrangement comprises a primary line comprising at least three flotation cells connected in series, wherein each subsequent flotation cell is arranged to receive the underflow from the previous flotation cell, the flotation cell comprising a tank, and the flotation cell comprising an impeller within the tank, and the flotation cell comprising g a gas supply within the tank, the tank has a volume of at least 200 m3, the flotation cell comprising a froth collection launder capable to receive the overflow, the froth collection launder comprising a froth overflow lip, the flotation cell having an available froth surface area, the flotation cell having a pulp area, where the pulp area is calculated as an average from the cross sectional areas of the tank at the height of the impeller, a ratio between a height from a bottom of the tank to the froth overflow lip of the froth collection launder and the diameter of the tank at the height of the impeller of a pulp area is less than 1.5, the third flotation cell or subsequent flotation cell in the series has a ratio between an available froth surface area and the pulp area (A froth/A pulp) is less than 0.45.

The invention is based on a froth flotation method for treating mineral ore particles suspended in slurry, and in the method separating the slurry in a flotation cell into an underflow and an overflow, the method comprising the steps of:

connecting at least three flotation cells in series for creating a primary line, feeding the slurry to a tank of the flotation cell, wherein each subsequent flotation cell is receiving the underflow from the previous flotation cell, introducing gas into the tank through a gas supply, mixing the slurry and the gas with an impeller within the tank, providing the tank with a volume of at least 200 m$^3$, receiving the overflow in a froth collection launder provided in the flotation cell, receiving the overflow over a froth overflow lip provided in the froth collection launder, forming an available froth surface area in the flotation cell, the flotation cell having a pulp area, where the pulp area is calculated as an average from the cross sectional areas of the tank at the height of the impeller, providing the tank with a ratio between a height from a bottom of the tank to the froth overflow lip of the froth collection launder and the diameter of the tank at the height of the impeller of a pulp area being less than 1.5, feeding the underflow to the third flotation cell or subsequent flotation cell in the series wherein a ratio between an available froth surface area and the pulp area comprises less than 0.45.

An effect of the method and arrangement of the invention is that reduced available froth area on the top of the tank leads to a good froth recovery since the transport distance of the fragile bubble particle aggregate to a froth collection launder is reduced. Further, the reduced horizontal transport distance takes more relevance for the recovery of coarse particles.

BRIEF DESCRIPTION OF THE DRAWINGS

In the following the invention will be described in greater de-tail by means of preferred embodiments with reference to the accompanying drawings, in which.

DETAILED DESCRIPTION OF THE INVENTION

Figure 1:
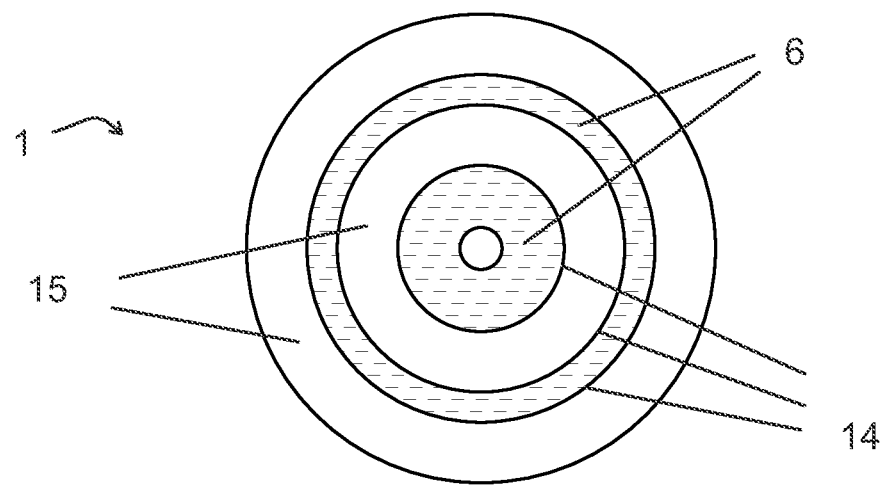
FIG. 1 shows a top view of a froth flotation arrangement.
Figure 2:
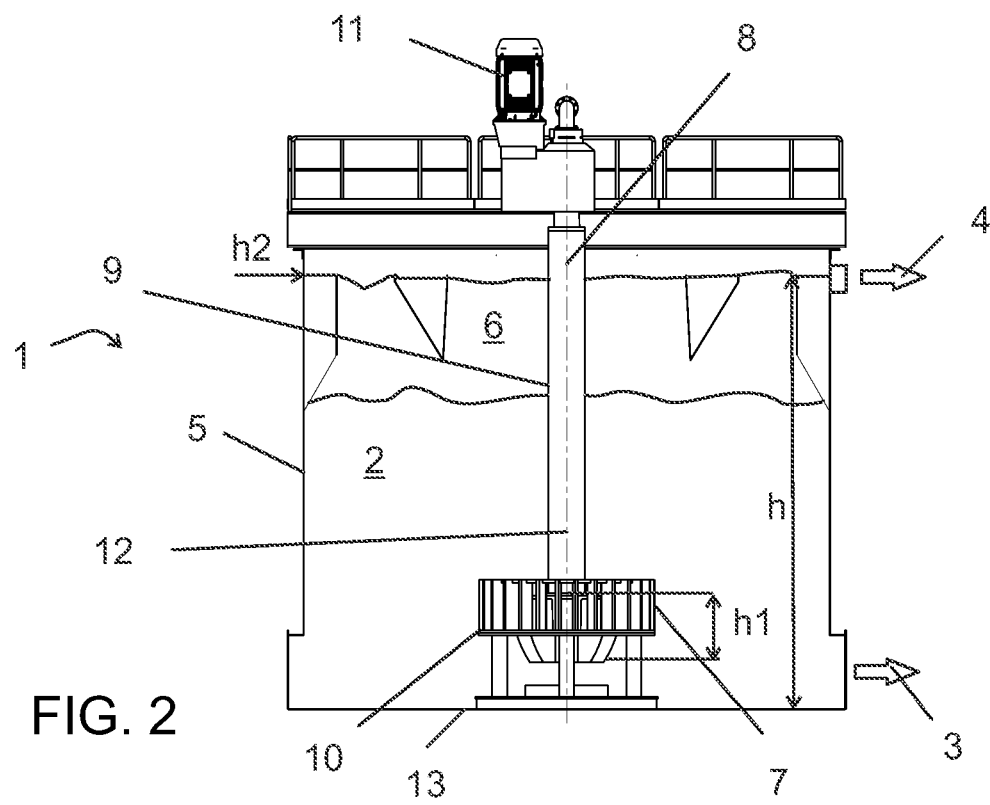
FIG. 2 shows a side view of the arrangement shown in FIG. 1.

FIG. 1 shows a top view of a froth flotation arrangement for treating mineral ore particles suspended in slurry. FIG. 2 shows a side view of the arrangement shown in FIG. 1. The froth flotation arrangement comprises a flotation cell 1 which separates the slurry 2 into an underflow 3 and an overflow 4.

Froth flotation is a physical separation method for separating particles based on differences in the ability of air bubbles to selectively adhere to specific mineral surfaces in a mineral/water slurry. If a mixture of hydrophobic and hydrophilic particles are suspended in water, and air is bubbled through the suspension, then the hydrophobic particles will tend to attach to the air bubbles.

The tank 5 of the flotation cell 1 contains slurry 2 which is a mixture of solid particles in a carrier liquid, e.g. mineral particles in water. The bubble-particle aggregates move up in the froth flotation cell 1 by buoyancy forming a froth 6 layer on the surface. The froth 6 comprises water, bubbles and particles.

The tank 5 is mechanically agitated. The tank 5 comprises an impeller 7 within the tank 5 and a gas supply 8. The agitator 9 disperses air in the slurry 2, pumps slurry 2, keeps solids in the suspension and provides an environment in the cell tank 5 for interaction of bubbles and hydrophobic particles and their subsequent attachment and therefore separation of valuable mineral particles from the undesired gangue mineral particles. The agitator 9 comprises an impeller 7 and a drive assembly for rotating the impeller 7. Further, the agitator 9 may also comprise a stator 10 for providing a more stable air dispersion. The drive assembly may comprise a motor 11 and a drive shaft 12.

A gas supply 8 to the froth flotation cell 1 comprises pressurized or self-aspirating gas supply. Examples of pressurized gas supply systems are pipes or tubes delivering gas to the bottom part of the tank 5 at least partly under the impeller 7. Gas may be supplied to the impeller 7 area also through conduits formed to the agitator 9 comprising the impeller 7.

The tank 5 volume is preferably large and comprises at least 200 $m^3$. The tank 5 volume comprises the volume of the tank 5 surrounding the slurry 2 measured from the bottom 13 of the tank 5 to height h2 of a froth overflow lip 14 of the froth collection launder 15. The tank 5 may comprise smaller cylindrical containers within it. Large tank 5 volumes have benefits such as lower capital, operating and maintenance costs.

Figure 3:
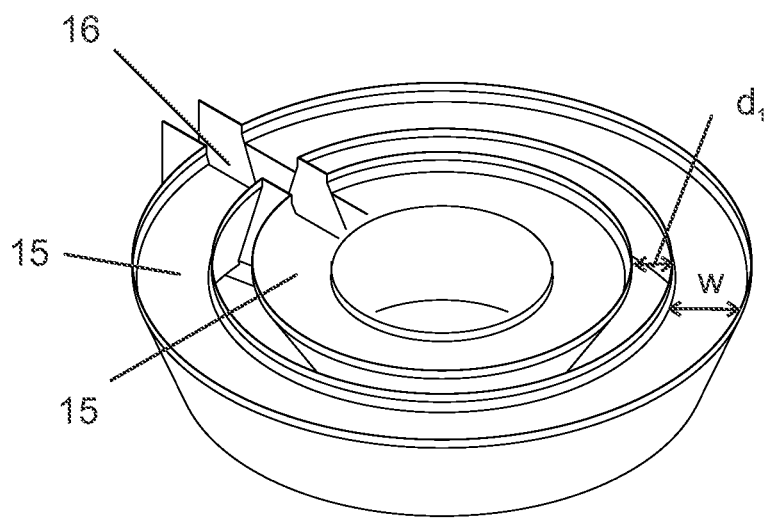
FIG. 3 shows a perspective view of two froth collection launders.

The tank 5 further comprises a froth collection launder 15 comprising a froth overflow lip 14. The froth collection launder 15 is capable to receive the overflow 4. FIG. 3 shows a perspective view of two froth collection launders 15. The froth collection launder 15 collects the froth 6 from the surface, i.e. the overflow 4, and transports it out of the tank 5 of the froth flotation cell 1. The froth collection launder 15 is an inclined drainage module. The froth 6 layer level is generally above the froth overflow lip 14 of the launder 15 permitting the froth 6 to flow over the overflow lip 14. The froth collection launder 15 comprises a subsurface discharge pipe 16 for carrying the froth 6 or concentrate product, i.e. the overflow 4, from the launder 15 to outside of the tank 5, for instance.

The froth flotation cell 1 can have one or more froth collection launders 15 which can be either internal or external, double, radial, depending on the capacity of the froth collection launder 15 necessary for the froth 6 removal. An internal launder means a froth collection launder 15 which is positioned at least partially above the pulp area $A_{pulp}$.

In the arrangement in the froth flotation cell 1 the ratio between an available froth surface area and the pulp area $A_{froth}/A_{pulp}$ is less than 0.45, where the pulp area $A_{pulp}$ is calculated as an average from the cross sectional areas of the tank 5 at the height of the impeller h1. The available froth surface area $A_{froth}$ is the horizontal area at the top of the tank 5 which is open for the froth 6 to flow at the height h of the lip 14 of the froth collection launder 15. The available froth surface area $A_{froth}$ is the dashed froth 6 areas shown in FIG. 1, FIG. 4 and FIG. 6. This reduced available froth surface area $A_{froth}$ on the top of the tank 5 shortens the transport distance of the fragile bubble particle aggregate to a froth collection launder or launders 15. Solid particles are an important component of the froth 6 structure and adequate solid particles will also lead to a high froth 6 stability and a better transportation of the froth 6 to the launder lip. A better particle recovery is then obtained and especially with coarse particles. Additionally, the reduced available froth surface area $A_{froth}$ stabilizes the froth 6 by creating a thicker froth 6 layer as a flotation cell 1 with a high froth surface area could lead to a situation where insufficient material with solid particles is present to stabilize the froth 6.

The ratio between a height h from a bottom 13 of the tank 5 to the lip 14 of the froth collection launder 15 and the diameter D of the tank 5 at the height of the impeller h/D is less than 1.5. This means the tank 5 is relatively shallow.

The third flotation cell 1 or subsequent flotation cell 1 in the series of connected flotation cells 1 has a ratio between the available froth surface area and the pulp area $A_{froth}/A_{pulp}$ less than 0.45.

The arrangement provides a high concentrate content to the overflow 4 of the flotation cell 1 even when the slurry 2 fed to the flotation cell 1 is diluted, i.e. the flotation cell 1 receives an underflow 4 resulting from a multiple of previous flotation cells 1. A shallow tank 5 having a relatively large pulp area $A_{pulp}$ provides a long residence time for the particles in the slurry 2 to meet air bubbles and create air bubble particle aggregates. The significance of the residence time increases with decreasing concentrate content of the inlet slurry 2. The reduced available froth surface area $A_{froth}$ creates a thicker froth 6 layer and results in a more pure froth 6. In an embodiment the ratio between a height h from a bottom of the tank 13 to the froth overflow lip 14 of the froth collection launder 15 and the diameter D of the tank h/D is less than 1.1. This means the tank 5 is shallow.

In an embodiment the ratio between the available froth surface area and the pulp area $A_{froth}/A_{pulp}$ is from 0.1 to 0.45. The decrease in the available surface area $A_{froth}$ for the froth 6 to flow causes the rising particles to flow also in a horizontal direction. In order to keep the froth 6 layer stabile the ratio is preferably not below the lower limit.

The periphery shape of the froth collection launder 15 shape may correspond the tank 5 periphery shape. The shape of the froth collection launder 15 may be circular or rectangular, for instance.

Figure 4:
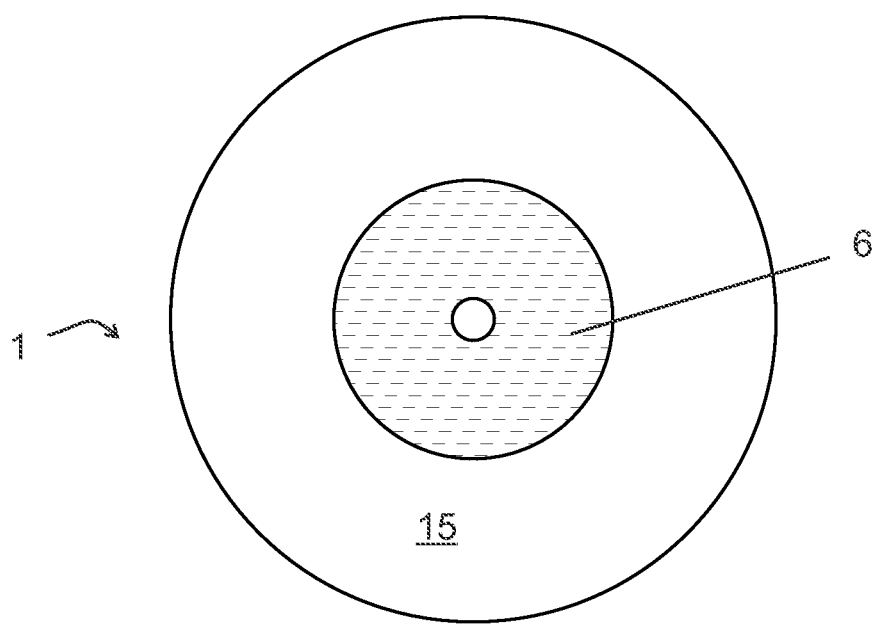
FIG. 4 shows a top view of a froth flotation arrangement.

The reduction of the available froth surface area $A_{froth}$ is preferably made at the periphery of the tank 5. This is advantageous as in the middle of the tank 5 are more gas bubbles than in the periphery. The reduction of the available froth surface area $A_{froth}$ can be implemented by means of an internal peripheral launder 15, or a froth blocker 17, for instance. An internal peripheral type of a froth collection launder 15 extends around the inside top of the sidewall of the tank 5 as shown in FIG. 4.

If the tank 5 comprises either an internal peripheral launder 15 or a peripheral froth blocker 17, the available froth surface area $A_{froth}$ may be defined by subtracting a launder area $A_{launder}$ which is the area covered by froth collection launders 15 at the height h2 of the froth overflow lip 14, and a blocker area which is the area not available for the froth 6 and not covered by the froth collection launders 15 at the height h2 of the lip 14 of the froth collection launder 15 from the pulp area $A_{pulp}$.

As an example, the ratio between the area of the internal peripheral launder and the pulp area $A_{int\ launder}/A_{pulp}$, or the ratio between the area of the peripheral froth blocker and the pulp area $A_{blocker}/A_{pulp}$, is more than 0.1, preferably more than 0.1 and less than 0.5. The angle of ascent for the air bubble particle aggregates limits the amount of the froth surface area which can be reduced. If the angle of descent becomes too low-gradient the air bubble particle aggregates start forming air pockets causing the particles to drop back.

In an embodiment the tank 5 is circular in cross section at the froth overflow lip height h2 of the tank 5 as shown in FIG. 2. Further, the froth collection launders 15 are circular shaped and positioned coaxially as shown in FIG. 1. A circular tank 5 provides a more stable air bubble dispersion causing a more stable froth layer as the impeller 7 is positioned in the middle of the tank 5 producing a circular shaped air bubble zone.

FIG. 3 presents an embodiment comprising two froth collection launders 15, and the first launder 15 is arranged within the second launder 15 at a distance apart $d_1$. The froth collection launders 15 comprise circular peripheries.

The average froth transport distance $d_{tr}$ is preferably less than 100 cm and more than 5 cm with circular shaped and coaxially positioned froth collection launders 15. The average froth transport distance $d_{tr}$ is the distance the froth 6 has to travel in horizontal direction before reaching the froth overflow lip 14. The average froth distance $d_{tr}$ is calculated as a ratio between the sum of the transport distances between the froth collection launders 15 and the number of the froth collection launders 15 $(d_1+d_2+ \ldots d_n)/n$. If two launders 15 have overflow lips 14 facing each other the transport distance is half of the distance between the two launders 15, e.g. half of the distance between the froth overflow lips 14. When two launders 15 have an overflow lip 14 and a launder side wall facing each other the transport distance is the distance between the two launders 15, e.g. the distance between the froth overflow lip 14 and the side wall.

If the average froth transport distance $d_{tr}$ is too long some particles of the air bubble agglomerates may detach and flow downwards. This froth drop back reduces the froth recovery to the froth collection launders 15.

Figure 5:
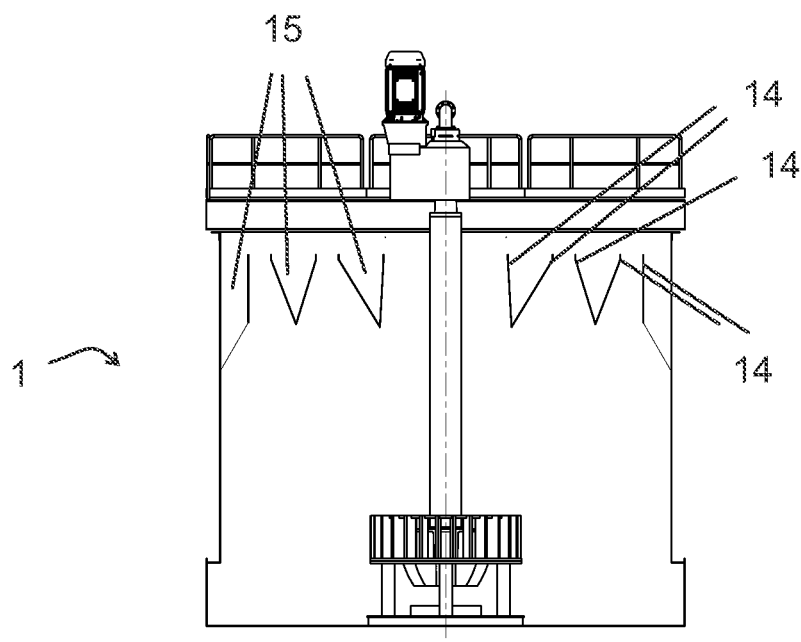
FIG. 5 shows a side view of a froth flotation arrangement.

The tank 5 may comprise at least three separate froth collection launders 15, and the number of froth overflow lips 14 in the froth collection lounders 15 is five as shown in FIG. 5. The outer froth collection launder 15 comprises an internal peripheral launder with one froth overflow lip 14. The other two internal froth collection launders 15 comprise two froth overflow lips 14 each. This arrangement reduces the drop back of the air bubble particle agglomerates as the transport distance to a froth collection launder 15 is shorter compared to a case where there is only one froth collection launder 15.

Figure 7:
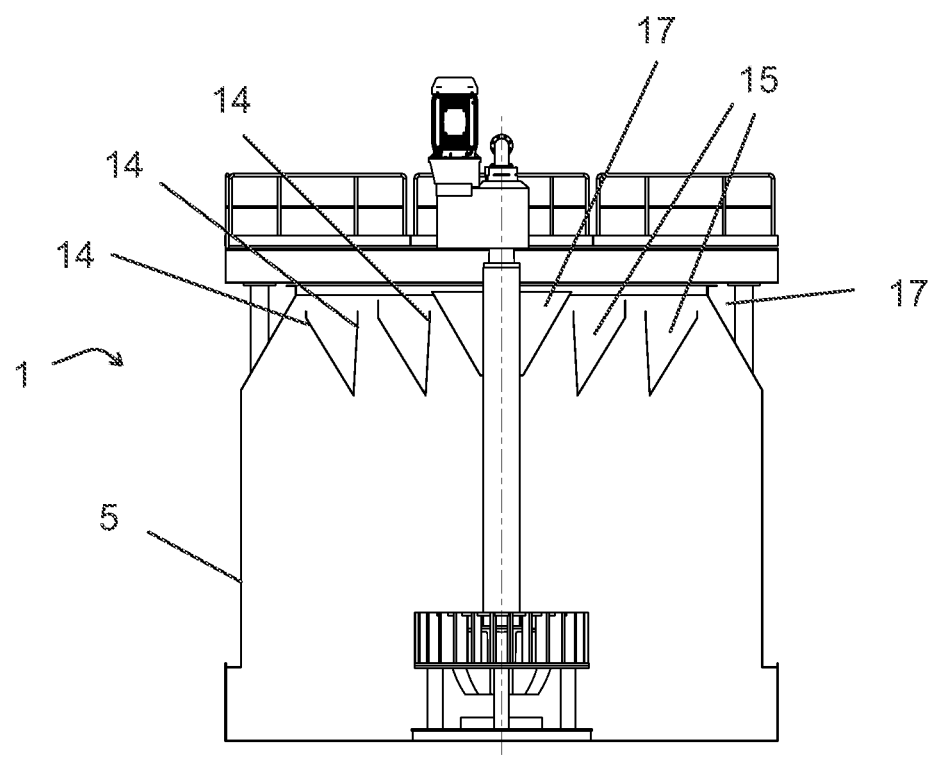
FIG. 7 shows a side view of a froth flotation arrangement.

FIG. 7 shows an embodiment where the froth flotation cell 1 comprises two froth collection launders 15 and a froth blocker 17, a cone blocker in the middle of the tank 5. The available froth surface area $A_{froth}$ is further reduced with a peripheral froth blocker 17. The outer froth collection launder 15 has two froth overflow lips 14. The inner froth collection launder 15 has one froth overflow lip 14 facing the froth blocker 17.

Figure 6:
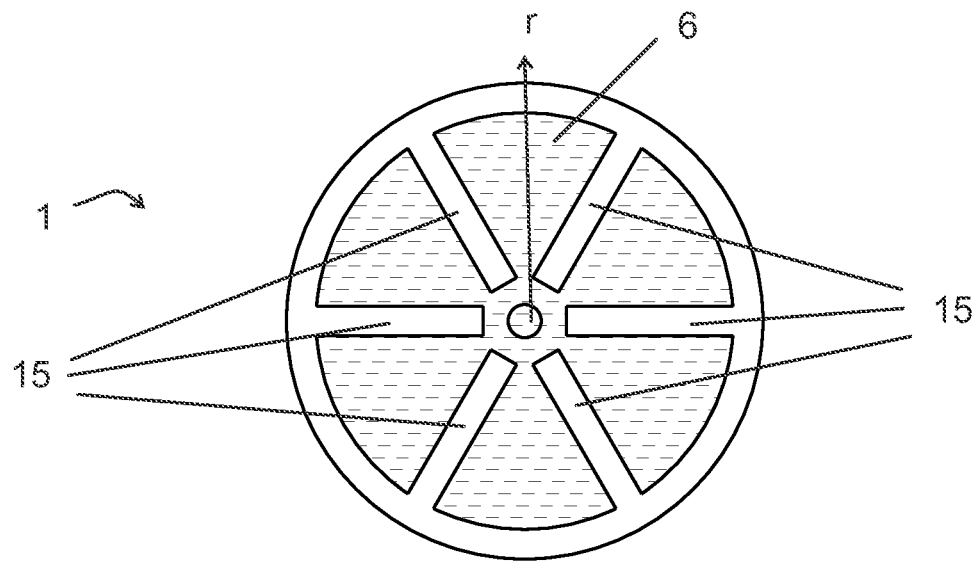
FIG. 6 shows a top view of a froth flotation arrangement.

In another embodiment the froth collection launders 15 are positioned in radial direction r of the tank 5 as shown in FIG. 6.

The average froth transport distance $d_{tr}$ is preferably less than 100 cm and more than 5 cm with froth collection launders 15 positioned in radial direction r of the tank 5. The average froth distance is calculated as a ratio between the sum of the transport distances between the froth collection launders 15 and the number of the froth collection launders $(d_1+d_2+ \ldots d_n)/n$. The transport distance between two launders 15 having overflow lips 14 facing each other is half of the distance between the two launders. The transport distance between two launders 15 having an overflow lip 14 and a launder side wall facing each other is the distance between the two launders. The distance between two launders 15 is an average of the distances between the first ends and the second ends of the two radially directed r launders 15.

Further, in an embodiment comprising froth collection launders 15 in a peripheral direction of the tank 5 a ratio between the average transport distance $d_{tr}$ and a froth collection launder 15 average width in radial direction $d_{tr}/w$ is 0.1-0.6. This ratio provides adequate size for the froth collection launder 15 to receive the flowing froth 6 overflow. If the froth collection launder 15 is too narrow compared to the amount of the overflowing froth 6 the transporting capacity of the launder is exceeded and the launder is clogged 15. In FIG. 3 the average transport distance $d_{tr}$ is $d_1/2$.

In a froth flotation method for mineral ore particles suspended in slurry 2 are treated. In the method the slurry 2 in a flotation cell 1 is separated into an underflow 3 and an overflow 4. The method comprises the steps of: connecting at least three flotation cells 1 in series for creating a primary line 18, feeding the slurry 2 to a tank 5 of the flotation cell 1, wherein each subsequent flotation cell 1 is receiving the underflow 3 from the previous flotation cell 1, introducing gas into the tank 5 through a gas supply 8, mixing the slurry 2 and the gas with an impeller 8 within the tank 5, providing the tank 5 with a volume of at least 200 m3, receiving the overflow 4 in a froth collection launder 15 provided in the flotation cell 1, receiving the overflow 4 over a froth overflow lip 14 provided in the froth collection launder 15, forming an available froth surface area $A_{froth}$ in the flotation cell 1, the flotation cell 1 having a pulp area $A_{pulp}$, where the pulp area $A_{pulp}$ is calculated as an average from the cross sectional areas of the tank 5 at the height h1 of the impeller 8, providing the tank 5 with a ratio between a height h from a bottom 13 of the tank 5 to the froth overflow lip 14 of the froth collection launder 15 and the diameter D of the tank 5 at the height h1 of the impeller 8 of a pulp area h/D being less than 1.5, feeding the underflow 3 to the third flotation cell 1 or subsequent flotation cell 1 in the series wherein a ratio between an available froth surface area and the pulp area A froth/A pulp comprises less than 0.45.

Further, in the froth flotation method the ratio between a height h from a bottom 13 of the tank 5 to the froth overflow lip 14 of a froth collection launder 15 and the diameter D of the tank is less than 1.1, for instance.

Figure 8:
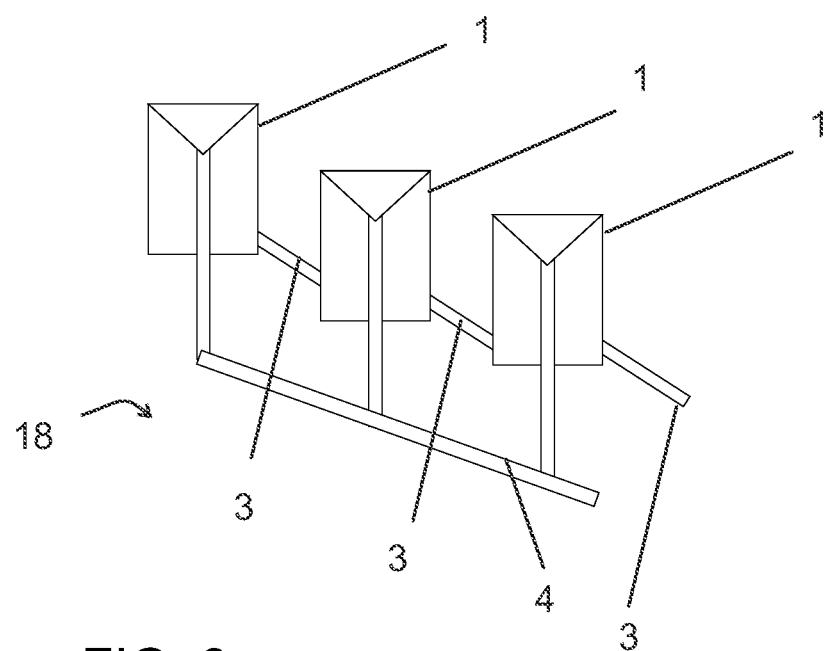
FIG. 8 shows a primary line in a froth flotation arrangement.

FIG. 8 shows a primary line 18 in a froth flotation arrangement. The primary line 18 comprises at least three flotation cells 1 connected in series as shown in FIG. 8. Each flotation cell 1 separates the slurry 2 into an underflow 3 and an overflow 4. Each subsequent flotation cell 1 is arranged to receive the underflow 3 from the previous flotation cell 1.

The presented arrangement and method are suitable for a slurry 2 comprising copper (Cu), for instance. The slurry 2 fed to the third flotation cell 1 or subsequent cell in the series may comprise copper (Cu) less than 0.2 weight %.

It will be obvious to a person skilled in the art that, as the technology advances, the inventive concept can be implemented in various ways. The invention and its embodiments are not limited to the examples described above but may vary within the scope of the claims.

Part list: 1 a flotation cell; 2 slurry, 3 an underflow; 4 an overflow; 5 a tank; 6 a froth; 7 an impeller; 8 a gas supply; 9 an agitator; 10 a stator; 11 a motor; 12 a drive shaft; 13 a bottom; 14 an overflow lip; 15 a froth collection launder; 16 a discharge pipe; 17 a froth blocker; 18 a primary line.

A blocker a blocker area; $A_{int\ blocker}$ an internal blocker area; $A_{launder}$ a launder area; $A_{int\ launder}$ a launder area; $A_{froth}$ a froth surface area; $A_{pulp}$ a pulp area; $d_1, d_2, \ldots d_n$ a distance; $d_{tr}$ a transport distance; D a diameter; h a height; h1 a height of the impeller; h2 a height; r a radial direction.

The invention claimed is:

1. A froth flotation arrangement for treating mineral ore particles suspended in slurry, comprising flotation cells for separating the slurry into an underflow and an overflow, wherein the arrangement comprises:
a primary line comprising at least three of said flotation cells connected in series, wherein each subsequent flotation cell of the at least three flotation cells is arranged to receive the underflow from the previous flotation cell,
wherein a third or subsequent flotation cell in the series of the at least three flotation cells comprises a tank having a volume of at least 200 m3, an impeller within the tank, a gas supply within the tank, and at least two froth collection launders capable of receiving the overflow, a froth collection launder of the at least two froth collection launders comprising a froth overflow lip,
wherein the third or subsequent flotation cell has:
an available froth surface area ($A_{froth}$);
a pulp area ($A_{pulp}$), where the pulp area ($A_{pulp}$) is calculated as an average from the cross sectional areas of the tank at the height (h1) of the impeller; and
a ratio between the available froth surface area and the pulp area ($A_{froth}/A_{pulp}$) less than 0.45,
a ratio between a height (h) from a bottom of the tank to the froth overflow lip and the diameter (D) of the tank at the height (h1) of the impeller (h/D) is less than 1.5, and
wherein the at least two froth collection launders are annular shaped, positioned coaxially, and define an average froth transport distance (dtr) less than 100 cm.

2. The froth flotation arrangement according to claim 1, wherein a ratio between a height (h) from a bottom of the tank to the froth overflow lip of the froth collection launder and the diameter (D) of the tank (h/D) is less than 1.1.

3. The froth flotation arrangement according to claim 1, wherein the ratio between the available froth surface area and the pulp area ($A_{froth}/A_{pulp}$) is from 0.1 to 0.45.

4. The froth flotation arrangement according to claim 1, wherein the periphery shape of the froth collection launder shape corresponds the tank periphery shape.

5. The froth flotation arrangement according to claim 1, wherein the froth collection launder comprises an Internal peripheral launder or the tank comprises an internal peripheral froth blocker.

6. The froth flotation arrangement according to claim 5, wherein the ratio between the area of the internal peripheral launder and the pulp area ($A_{int\ launder}/A_{pulp}$), or the ratio between the area of the internal peripheral froth blocker and the pulp area ($A_{int\ blocker}/A_{pulp}$), is more than 0.1, preferably more than 0.1 and less than 0.5.

7. The froth flotation arrangement according to claim 1, wherein the tank is circular in cross section at the overflow lip height (h2) of the tank.

8. The froth flotation arrangement according to claim 1, wherein the average froth transport distance (dtr) is more than 5 cm.

9. The froth flotation arrangement according to claim 1, wherein the tank comprises at least three separate froth collection launders.

10. The froth flotation arrangement according to claim 9, wherein the number of overflow lips in the froth collection launders is five.

11. The froth flotation arrangement according to claim 1, wherein the froth collection launders are positioned in radial direction (r) of the tank.

12. The froth flotation arrangement according to claim 1, wherein a ratio between the average transport distance (dtr) and a froth collection launder average width (w) in radial direction (r)(dtr/w) is 0.1-0.6.

13. The froth flotation arrangement according to claim 1, wherein the gas supply comprises a pipe delivering gas to the bottom part of the tank at least partly under the impeller, or a conduit formed to an agitator comprising the impeller.

14. The froth flotation arrangement according to claim 1, wherein the flotation cell comprises an agitator comprising an impeller and a stator.

15. A froth flotation method for treating mineral ore particles suspended in slurry, and in the method separating the slurry in flotation cells into an underflow and an overflow, the method comprising the steps of:
connecting at least three of said flotation cells in series for creating a primary line, wherein each subsequent flotation cell of the at least three flotation cells receives the underflow from a previous flotation cell,
feeding the slurry to a tank of a third or subsequent flotation cell in the series of the at least three flotation cells as underflow,
introducing gas into the tank through a gas supply,
mixing the slurry and the gas with an impeller within the tank,
providing the tank with a volume of at least 200 m3,
receiving the overflow in a froth collection launder of at least two froth collection launders provided in the third or subsequent flotation cell,
receiving the overflow over a froth overflow lip provided in the froth collection launder,
forming an available froth surface area ($A_{froth}$) in the third or subsequent flotation cell,
providing the tank with a ratio between a height (h) from a bottom of the tank to the froth overflow lip of the froth collection launder and the diameter (D) of the tank at the height (h1) of the impeller of a pulp area (h/D) being less than 1.5, and
wherein the third or subsequent flotation cell has pulp area ($A_{pulp}$), wherein the pump area ($A_{pulp}$) is calculated as an average from the cross sectional areas of the tank at the height of the impeller (h1), and a ratio between the available froth surface area and the pulp area ($A_{froth}/A_{pulp}$) is less than 0.45, and
wherein the at least two froth collection launders are annular shaped, positioned coaxially, and define an average froth transport distance (dtr) less than 100 cm.

16. The froth flotation method according to claim 15, wherein the ratio between a height (h) from a bottom of the tank to the froth overflow lip of a froth collection launder and the diameter (D) of the tank (h/D) is less than 1.1.

17. The froth flotation method according to 15, wherein the slurry comprise copper (Cu).

18. The froth flotation method according to claim 17, wherein the slurry fed to the third flotation cell or a subsequent flotation cell in the series comprises copper (Cu) less than 0.2 weight %.

* * * * *